June 22, 1943.    C. HOLLERITH    2,322,360

PRESSURE SEALED WHEEL

Filed May 16, 1940

Inventor
CHARLES HOLLERITH
By Beaman & Langford
Attorneys

Patented June 22, 1943

2,322,360

UNITED STATES PATENT OFFICE 2,322,360

PRESSURE SEALED WHEEL

Charles Hollerith, Jackson, Mich., assignor to Hayes Industries, Inc., Jackson, Mich., a corporation of Michigan Application May 16, 1940, Serial No. 335,443

11 Claims. (Cl. 301—6)

The present invention relates to wheels for amphibian airplanes and more particularly to such wheels arranged to have the internal recesses thereof sealed from the atmosphere and maintained under air pressure to prevent the entry of water when the wheels are entirely or partly submerged.

Attempts have been made to prevent the entry of water into wheels used on amphibian airplanes for the reason that water not only interferes with the operation of the brakes, but also its presence within wheels is undesirable for other reasons, including its unbalancing of the wheels when rotating at high rates of speed and its damage to bearing structures. According to the present invention, water is prevented from entering wheels and coming into contact with operative wheel structure supported within the wheel by employing fairings to house operative wheel structure, such as bearings and brakes, associated with the wheel body, and subjecting the interior of the wheel to air under pressure. The air not only prevents water from entering the wheel, but should water enter the wheel, in some accidental manner, the air under pressure will blow the water from the wheel.

An object of the present invention is to provide a hollow wheel arranged to maintain the interior thereof under air pressure.

Another object of the invention is to provide a wheel having operative wheel mechanism supported therein with means for sealing the interior from the atmosphere and for maintaining the interior of the wheel under air pressure.

A still further object of the invention is to house operative wheel operating mechanism in wheel recesses by means of fairings and to maintain the interior of the wheel under air pressure to prevent the inlet of water.

Figure 1:
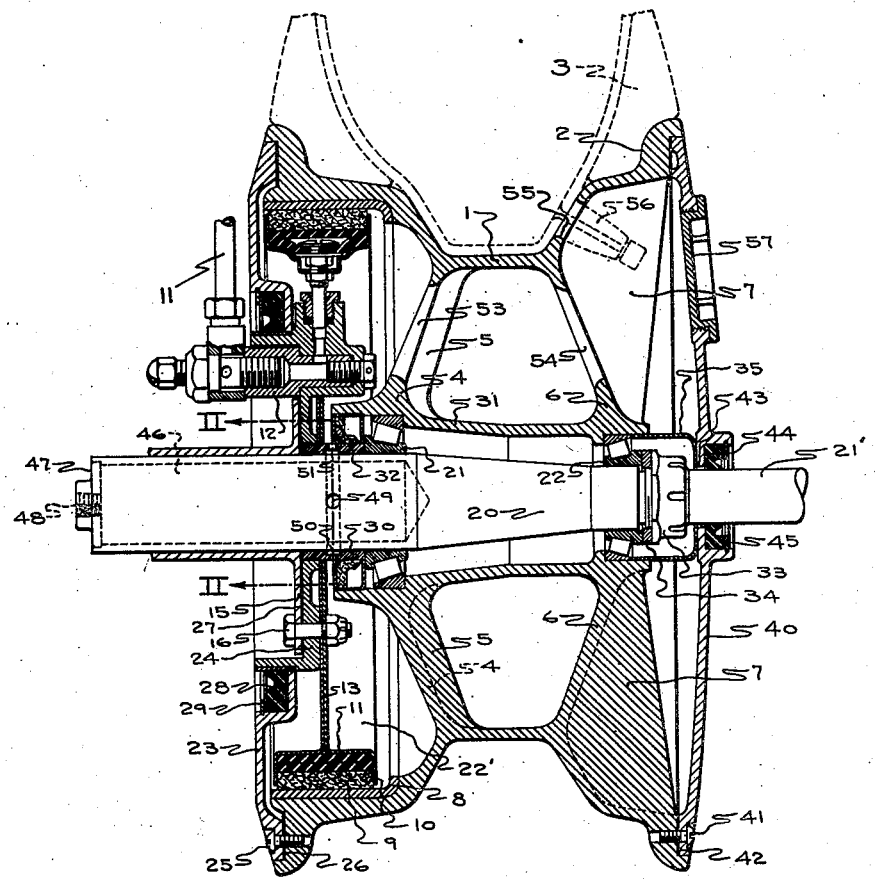
Figure 2:
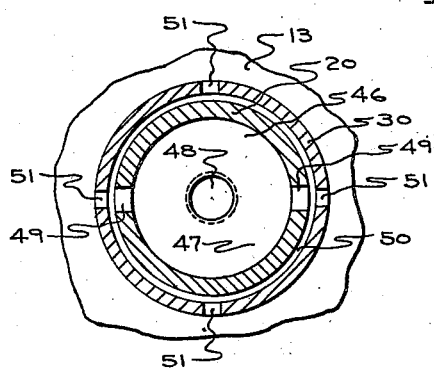
Figure 3:
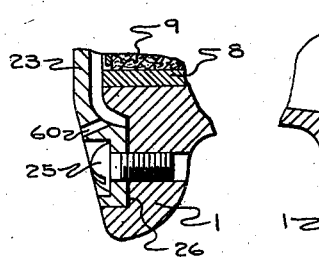
Figure 4:
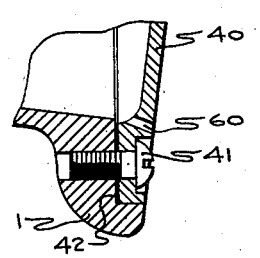

These and other objects will be apparent from the following specification when taken with the accompanying drawing in which:

Fig. 1 is a vertical section of a wheel disclosing an embodiment of the invention, Fig. 2 is a section on the line II—II of Fig. 1, and Figs. 3 and 4 are sections of portions of wheels similar to those disclosed in Fig. 1, disclosing another embodiment of the invention.

Referring particularly to the drawing, the reference character 1 indicates a wheel body provided with a rim 2 for supporting a tire 3, shown in dotted outline. The wheel 1 is provided with reinforcing flanges 4, 5, 6 and 7 of known form and arranged in a conventional manner. The wheel 1 is provided with a usual brake drum 8 in operative relation with a brake block 9, supported in an annular channel member 10. The channel member 10 also supports a hydraulic tube 11, connected through an inlet connection 12 to a source of hydraulic fluid pressure for urging the brake block 9 against the drum 10 for braking the wheel. The channel member 10 is supported by a web 13 which is in turn connected by bolts 16 to an annular portion of the member 15, comprising a portion of the landing gear of the amphibian airplane on which the wheel 1 is mounted.

The wheel 1 is mounted on an axle 20 through bearings 21 and 22. The axle 20 is fixedly secured at one end of the wheel to the landing gear member 15 and is provided with a portion 21' at the other end for receiving another landing gear portion not shown. As shown particularly in Fig. 1, the brake mechanism including the drum 8, the block 9, the hydraulic tube 11, and the supporting web 13, are disposed in a recess 22 in one side of the wheel 1. The recess 22' is enclosed by an outer annular fairing member 23, and an inter-annular fairing member 24. The outer annular fairing member 23 is secured to the wheel 1 by screws 25 and the inner annular fairing member 24 is clamped by the bolts 15 between the landing gear member 15 and the supporting web 13. A sealing gasket 26 is provided between the outer annular fairing member 23 and the wheel 1 and a sealing gasket 27 is provided between the landing gear member 15 and the inner annular fairing member 24. Also a sealing gasket 28 is disposed between the fairing members 23 and 24 and is maintained in position by a spring ring 29.

Disposed on the axle 20 is a sleeve 30 which abuts against the landing gear member 15 at one end and the bearing 21 at the other end. The sleeve 30 is non-rotatable with the wheel 1 and supports and positions the fairing member 24 and the supporting web 13 as shown, being concentrically disposed with respect thereto. The hub 31 of the wheel 1 is provided with a grease sealing ring 32 between the bearing 21 and the outer end of the wheel 1 adjacent thereto which rotates with the wheel 1 and slides on the sleeve 30. At the opposite end of the hub 31 a nut 33 threaded onto the axle 21 bears against the bearing 22 through a washer 34, maintaining the inner and outer races of the bearing 22 in radial supporting alignment and maintaining the wheel 1 in assembled relation on the axle 20 by clamping the wheel through the ring 30 and the bearing 21 against the landing gear member 15. A protective housing 35 covers the nut 33 and the exposed end of the bearing 22.

At the opposite side of the wheel 1 from the fairing members 23 and 24 is a fairing member 40 secured to the wheel 1 by screws 41. A sealing gasket 42 is disposed between the fairing member 40 and the wheel 1. An opening 43 is provided at the center of the fairing member 40 for permitting the passage of the end 21 of the axle 20, and a gasket 44 provides a seal between the fairing member 40 and the end 21 of the axle 20. The gasket 44 is maintained in position by a spring ring 45.

The end of the axle 20 adjacent the landing gear member 15 is provided with a hollow interior 46 which is closed by a cap 47 provided with a tapped bore 48 for receiving a connection to a source of compressed air. The source of compressed air may be anything desired and for instance, may be a compressor or may be a suitable connection with the exhaust from the engine of the amphibian airplane with which the wheel 1 is associated. A plurality of ports 49, shown particularly in Figs. 1 and 2, provide a communication between the hollow interior 46 of the axle 20 and the exterior thereof. The ports 49 are in alignment with an annular groove 50 in the interior surface of the sleeve 30. Communicating with the groove 50 are a plurality of ports 51 which in turn communicate with the recess 22 in the wheel 1. As will be particularly clear from Fig. 1, the recess 22 of the wheel 1 communicates with the remaining internal chambers of the wheel 1 through openings 53 and 54 in the reinforcing webs 4 and 6 respectively. Thus, through the ports 49, the groove 50, and the ports 51 there is provided a direct communication between the interior of the wheel and the interior 46 and the axle 20, whereby compressed air through the tapped bore 48 may be introduced into the interior of the wheel 1.

While all connecting edges and surfaces are provided with sealing gaskets, it has been found in actual practice that such gaskets do not provide a sufficient sealing action to prevent the entrance of water when the wheel is immersed or partly immersed in water. By subjecting the interior of the wheel 1 to compressed air at a sufficient pressure to overcome any exterior pressure of water to which the wheel 1 is subjected, the interior of the wheel 1 may be maintained dry. However, should any water enter the interior of the wheel 1 by some accidental or unforeseen manner, the internal compressed air will force such water from the wheel. The water will be forced from the wheel past the gaskets 26 and 42, due to the fact that the water will accumulate adjacent the gaskets 26 and 42 either due to the action of gravity if the wheel is stationary or by centrifugal force if the wheel is rotating. The valve stem opening 55 in the body 1 is sealed by the valve stem 56. A removable plug 57 in the fairing member 40 permits access to the valve stem 56 for inflating the tire.

As an embodiment of the invention, the fairing members 23 and 40, as shown particularly in Figs. 3 and 4, respectively, may be provided with ports 60 adjacent their outer peripheries for permitting the escape of accidentally introduced water under the action of the internal compressed air, as described hereinabove. The ports 60 should be sufficiently small in diameter so as to not interfere with the maintaining of a sufficient air pressure within the wheel 1 and should be spaced circumferentially about the fairing members 23 and 40 in sufficient numbers to permit the draining or expelling of substantially all of the entrapped water in any one position of the wheel.

While the invention has been described as applied to wheels employed on amphibian airplanes, it will be understood that it is not so limited and may be employed on any wheel where the entrance of water into the interior thereof is undesirable. With respect to the general construction disclosed, it will be understood that the wheel axle could be supported at one end rather than from both ends and the brake structure could be dual rather than single. Furthermore, the term air as used in the claims contemplates the use of any gas, as for instance, gas from the engine exhaust.

Having thus described my invention, what I desire to secure by Letters Patent and claim is:

1. In combination with a wheel and supporting structure therefor for use in water, said wheel having a body and a hub, said supporting structure being associated with said hub and supporting said wheel for rotation, brake mechanism associated with said wheel, covering means in sealing relation with said body and supporting structure, for providing an enclosed chamber housing said mechanism in said wheel, and means to introduce air under pressure into said chamber to prevent the entrance of water thereinto.

2. In combination with a wheel and supporting structure therefor for use in water, said wheel having a body and a hub, said supporting structure being associated with said hub and supporting said wheel for rotation, brake mechanism associated with said wheel, fairing means in substantial water tight sealing relation with the sides of said wheel and providing an internal chamber housing said brake mechanism, and means to introduce air under pressure into said chamber to prevent the entrance of water thereinto.

3. In combination with a wheel and supporting structure therefor for use in water, said wheel having a body and a hub, said supporting structure being associated with said hub and supporting said wheel for rotation, brake mechanism associated with said wheel, said wheel having an internal substantially water tight chamber housing said brake mechanism, and means to introduce air under pressure into said chamber to prevent the entrance of water thereinto.

4. In combination with a wheel and supporting structure therefor for use in water, said wheel having a body and a hub, said supporting structure being associated with said hub and supporting said wheel for rotation, said wheel having a recess in one side thereof, brake mechanism disposed in said recess, covering means in sealing relation with said body and supporting structure constituting said recess an internal enclosed chamber, and means to introduce air under pressure into said chamber to prevent the entrance of water thereinto.

5. In combination with a wheel and supporting structure therefor for use in water, said wheel having a body and a hub, said supporting structure being associated with said hub and supporting said wheel for rotation, brake mechanism associated with said wheel, covering means in sealing relation with said body and supporting structure, for providing an enclosed chamber housing said mechanism in said wheel, means to introduce air under pressure into said chamber to prevent the entrance of water thereinto, and means having restricted ports communicating with the interior of said chamber through which water within the chamber may be blown by the air under pressure therein.

6. In combination with a wheel and supporting axle therefor for use in water, said wheel having a body and a hub, said axle projecting through said hub, bearings supporting said body for rotation on said axle, means for maintaining said body on said axle, brake mechanism mounted in said wheel, fairing means cooperating with said body and axle, sealing said bearings and brake mechanism in said wheel, said axle having an internal port, means having a port providing communication between said internal port and the interior of said wheel, and means to introduce air under pressure into said internal port whereby it is conducted into the interior of said body to prevent the entrance of water thereinto.

7. In combination with a wheel and supporting axle therefor, said wheel having a body and a hub, said axle projecting through said hub, bearings supporting said body for rotation on said axle, means for maintaining said body on said axle, brake mechanism mounted in said wheel, fairing means cooperating with said body and axle in substantially water tight sealing relation therewith sealing said bearings and brake mechanism in said wheel, and means to introduce air under pressure into said wheel.

8. In combination with a wheel and a supporting axle therefor for use in water, said wheel having a body, a hub and a rim, said axle projecting through said hub, bearings supporting said body for rotation on said axle, means for maintaining said body on said axle, said wheel having a recess in one side thereof, brake mechanism mounted in said recess, sealing means constituting said recess an enclosed chamber, said axle having an internal port, means having a port providing communicating between said internal port and said recess around one end of said wheel, and means to introduce air under pressure into said internal port whereby it is conducted to the interior of said body to prevent the entrance of water thereinto.

9. In combination with a wheel and supporting structure therefor for use in water, said wheel having a body portion, a hub and a rim, said supporting structure being associated with said hub and supporting said wheel for rotation, operative brake mechanism associated with said wheel, covering means in sealing relation with said rim and supporting structure, housing said mechanism in said wheel, means to introduce air under pressure into said body portion to prevent the entrance of water thereinto, and means having restricted ports communicating with the interior of said body through which water within said body portion may be blown by air under pressure.

10. In combination with a wheel and supporting axle therefor for use in water, said wheel having a body and a hub, said axle projecting through said hub, bearings supporting said body for rotation on said axle, means for maintaining said body on said axle, brake mechanism mounted in said wheel, means cooperating with said body and axle, sealing said bearings and brake mechanism in said wheel, said axle having an internal port, means having a port providing communication between said internal port and the interior of said wheel, and means to introduce air under pressure into said internal port whereby it is conducted into the interior of said body to prevent the entrance of water thereinto.

11. In combination with a wheel and supporting axle therefor for use in water, said wheel having a body and a hub, said supporting axle being associated with said hub and supporting said wheel for rotation, brake mechanism associated with said wheel, covering means in sealing relation with said body and supporting axle, housing said mechanism in said wheel, said axle having an internal port, means having a port providing communication between said internal port and the interior of said wheel, and means to introduce air under pressure into said internal port whereby it is conducted into the interior of said body to prevent the entrance of water thereinto.

CHARLES HOLLERITH.